United States Patent
Borovikov

(10) Patent No.: US 9,059,990 B2
(45) Date of Patent: Jun. 16, 2015

(54) SYSTEM AND METHODS FOR ENSURING CONFIDENTIALITY OF INFORMATION USED DURING AUTHENTICATION AND AUTHORIZATION OPERATIONS

(71) Applicant: Kaspersky Lab ZAO, Moscow (RU)

(72) Inventor: Nikolay V. Borovikov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/256,357

(22) Filed: Apr. 18, 2014

(65) Prior Publication Data

US 2015/0033299 A1    Jan. 29, 2015

(30) Foreign Application Priority Data

Jul. 23, 2013    (RU) ................................ 2013134220

(51) Int. Cl.
| | |
|---|---|
| H04L 29/06 | (2006.01) |
| G06F 21/60 | (2013.01) |
| G06F 21/42 | (2013.01) |
| G06F 21/31 | (2013.01) |
| G06F 21/34 | (2013.01) |

(52) U.S. Cl.
CPC .......... *H04L 63/0853* (2013.01); *G06F 21/313* (2013.01); *G06F 21/34* (2013.01); *G06F 21/42* (2013.01); *G06F 21/60* (2013.01); *H04L 63/083* (2013.01); *H04L 63/0861* (2013.01)

(58) Field of Classification Search
CPC ............................... G06F 21/34; G06F 21/313
See application file for complete search history.

(56) References Cited

U.S. PATENT DOCUMENTS

| 7,565,536 | B2 | 7/2009 | Vassilev et al. |
|---|---|---|---|
| 8,132,244 | B2* | 3/2012 | Baltzer ............................ 726/9 |
| 8,707,029 | B2* | 4/2014 | Brand et al. .................. 713/156 |
| 2006/0190606 | A1* | 8/2006 | Kohavi .......................... 709/226 |
| 2008/0212771 | A1* | 9/2008 | Hauser ............................ 380/44 |
| 2009/0300744 | A1 | 12/2009 | Guo et al. |
| 2010/0058064 | A1 | 3/2010 | Kirovski et al. |
| 2010/0299518 | A1* | 11/2010 | Viswanathan et al. ........ 713/152 |
| 2010/0325424 | A1 | 12/2010 | Etchegoyen |
| 2011/0321144 | A1* | 12/2011 | Saxena et al. ..................... 726/6 |
| 2012/0192260 | A1* | 7/2012 | Kontsevich ....................... 726/9 |
| 2012/0321087 | A1 | 12/2012 | Fleischman et al. |
| 2013/0191902 | A1 | 7/2013 | Friedl et al. |

FOREIGN PATENT DOCUMENTS

| CN | 101635629 A | 1/2010 |
|---|---|---|
| EP | 2008164499 A1 | 8/2010 |

(Continued)

*Primary Examiner* — Jung Kim
*Assistant Examiner* — Janusz Kusyk
(74) *Attorney, Agent, or Firm* — Arent Fox LLP; Michael Fainberg

(57) ABSTRACT

Disclosed are systems and methods for ensuring confidentiality of information of a user of a service. One example method includes receiving a request to carry out an operation control procedure for the service; identifying the user of the service; selecting a trusted device associated with the identified user of the service; sending, to the selected trusted device, a request for confidential information of the user, wherein the confidential information is used to carry out the operation control procedure; receiving the confidential information from the selected trusted device; and carrying out the operation control procedure using the received confidential information.

24 Claims, 4 Drawing Sheets

(56) References Cited

FOREIGN PATENT DOCUMENTS

| EP | 2264973 | A2 | 12/2010 |
| RU | 2005113995 | C2 | 10/2005 |
| RU | 2004131023 | C2 | 4/2006 |
| WO | WO 02/084456 A2 * | | 10/2004 ............ G06F 21/313 |

* cited by examiner

SYSTEM AND METHODS FOR ENSURING CONFIDENTIALITY OF INFORMATION USED DURING AUTHENTICATION AND AUTHORIZATION OPERATIONS

CROSS-REFERENCE TO RELATED APPLICATIONS

The present disclosure claims benefit of priority under 35 U.S.C. 119(a)-(d) to a Russian Application No. 2013134220 filed on Jul. 23, 2013, which is incorporated by reference herein.

TECHNICAL FIELD

The present disclosure relates generally to the field of information security, and more specifically, to systems and methods for ensuring confidentiality of information used during authentication and authorization operations.

BACKGROUND

As computer technology grows in popularity, it is becoming widely available, mobile and functional, and users are becoming more proficient in working with computer technology. Such a high level of development of computer technology can also bring a number of security threats, due for example to the low level of protection of confidential information (CI) used during authorization of operations or authentication of the identity of the user of various electronic service.

Ensuring protection of CI is an urgent problem. The spread of malicious software capable of intercepting CI being entered from a keyboard or pin pad (a device for entering CI) of bank equipment, and also the spread of techniques of intercepting, illegal capturing and obtaining of CI may be the cause of unlawful access to bank accounts, illegal authorization of operations, and loss of data.

Each year more and more methods are appearing for the use of CI, such as a bank card number, password, login, biometric data, and so on. For example, by using bank account data a user can make purchases on the Internet, pay bills, and control his bank account.

At the same time, there is a growing number of ways of interception and unlawful use of CI. Spyware, keyloggers, and other malware installed on unprotected personal computers (PCs) are able to intercept the information being entered by the user, even if the CI was entered using a virtual keyboard, and send it to a hacker to carry out unlawful operations. To prevent the unlawful use of CI, some services make use of onetime passwords sent by SMS (Short Message Service), however hackers have developed schemes of intercepting SMS and obtaining the onetime passwords for authorization of unlawful operations. Another unresolved problem is the interception and reading of data needed to forge a bank card, or the use of the data read to perform banking operations. Hackers install interception means on bank equipment, such as a fake keypad, a magnetic card reader, or a camera to capture the moment of entering a card's pin code. In another familiar instance the hackers install specialized malware on computers which control the pin pads of payment systems, thereby obtaining CI entered by the unsuspecting user, and they employ this information to carry out unlawful operations.

The growth trend in vulnerable ways of using CI is a problem already confronting banks, corporations, critically important infrastructure facilities, and ordinary users of information systems, and it needs urgent addressing

SUMMARY

Disclosed are systems, methods and computer program products for ensuring confidentiality of information of a user of a service. One technical result of the present aspects is to increase protection for the confidentiality of information being transmitted for purposes of authentication and authorization. This technical result is accomplished by using a trusted computer device for the entry and transmittal of said CI.

In one aspect, a method of ensuring confidentiality of information includes receiving a request to carry out an operation control procedure for the service, identifying the user of the service, selecting a trusted device associated with the identified user of the service, sending, to the selected trusted device, a request for confidential information of the user, wherein the confidential information is used to carry out the operation control procedure, receiving the confidential information from the selected trusted device, and carrying out the operation control procedure using the received confidential information.

In one aspect, the identifying the user of the service is based on data entered by the user of the service on a device that is used to send the request to carry out the operation control procedure.

In another aspect, the confidential information is entered by the user of the service on the trusted device through a protected module of the trusted device or through an application.

In another aspect, the operation control procedure comprises one or more of an operation of authentication of the user of the service or an authorization procedure for the service.

In another aspect, the service comprises one or more of an online banking service, an Internet commerce service, a payments service, a remote work service, program commands used at critically important infrastructure facilities, or operations of installing software on devices being controlled.

In another aspect, the confidential information comprises a password to an account record, biometric data, or a PIN code.

In another aspect, the trusted device comprises a notebook, a netbook, a smartphone, a mobile telephone, a communicator, or a thin client.

In another aspect, the trusted device uses a protected channel in encrypted form for receiving the request for the confidential information and sending the confidential information.

In another aspect, a system for ensuring confidentiality of information includes a processor configured to receive a request to carry out an operation control procedure for the service, identify the user of the service, select a trusted device associated with the identified user of the service, send, to the selected trusted device, a request for confidential information of the user, wherein the confidential information is used to carry out the operation control procedure, receive the confidential information from the selected trusted device, and carry out the operation control procedure using the received confidential information.

In a further aspect, a computer program product for ensuring confidentiality of information is provided that includes a non-transitory computer readable medium including code for receiving a request to carry out an operation control procedure for the service, identifying the user of the service, selecting a trusted device associated with the identified user of the service, sending, to the selected trusted device, a request for confidential information of the user, wherein the confidential information is used to carry out the operation control procedure, receiving the confidential information from the selected trusted device, and carrying out the operation control procedure using the received confidential information.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for ensuring confidentiality of information used during authentication and authorization operations by using a trusted device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
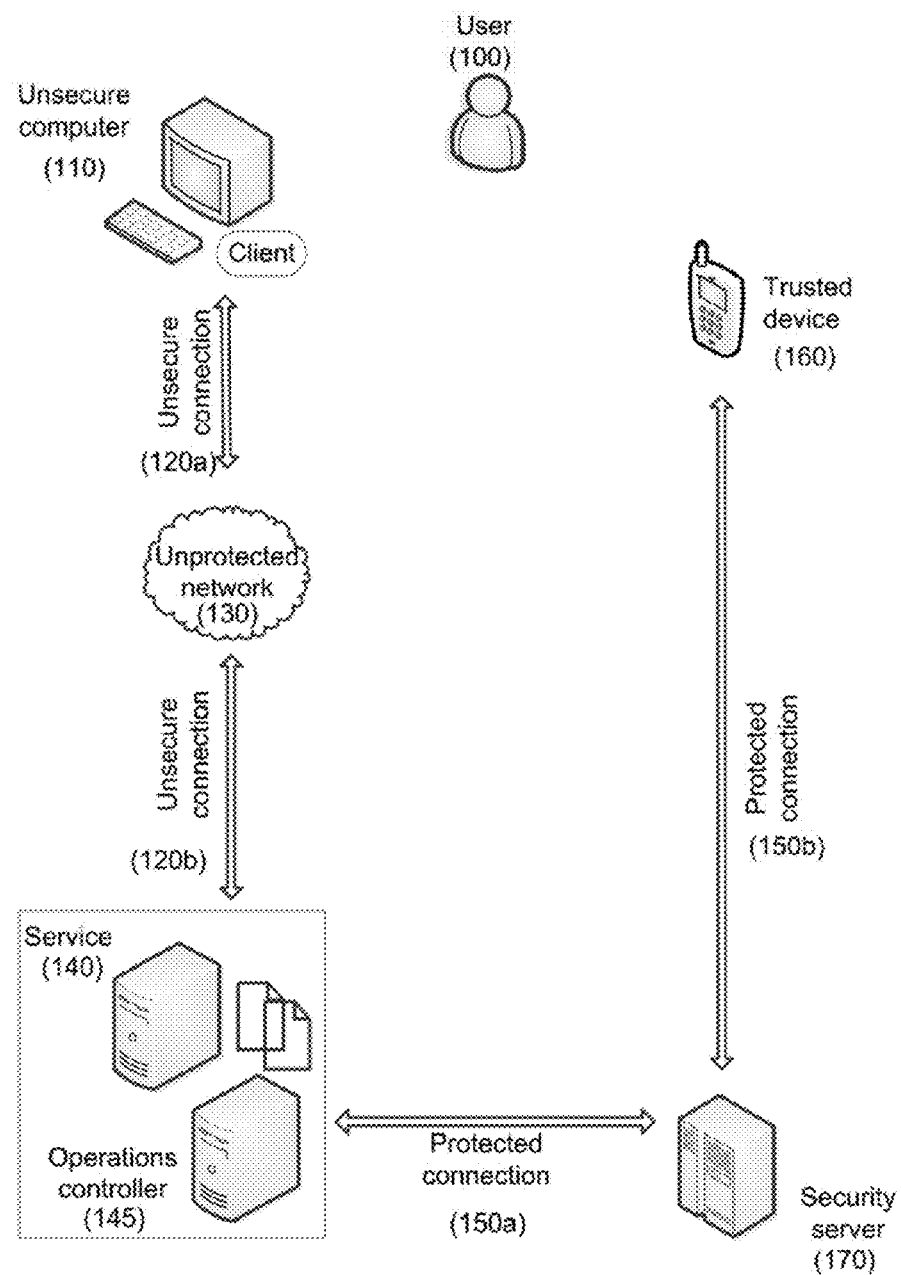
FIG. 1 shows one example system for sing a trusted device to ensure confidentiality of information.

FIG. 1 shows one example system for using a trusted device to ensure confidentiality of information. Generally, the user 100 is using an unsecure computer 110 to obtain access to a network service 140, such as an online banking service, email server or web server. By computer 110 is meant either a personal computer or a notebook, a netbook, a tablet computer, a smartphone, or terminal equipment, as well as any other user device. The connection can occur via unprotected networks 130 (e.g., public wireless local-area networks or WLAN implemented using Wi-Fi technology) with the use of unsecure connections 120a and 120b (e.g., open data transfer protocols used in public wireless networks). The unprotected network 130 can also be a public or private network, such as GSM, COMA, LTE and others. For example, a user may use a notebook without an antivirus application and an unpatched browser version (e.g., not updated to the latest version) for access to an online bank via an unencrypted Wi-Fi network (e.g., a Wi-Fi network in which data is transferred in open form and can be intercepted) in a public place (e.g., an airport). Accordingly, in this example, there is a high level of risk for the user, since his personal data, or confidential information (e.g., a credit card number and its PIN) can be stolen by malicious programs which exploit various vulnerabilities of both the computer 110 and the applications installed thereon, and the features of the unprotected network 130 and the unsecure connections 120a and 120b.

In one example aspect, however, in order to ensure confidentiality of the information used during the operations of authentication and authorization at the service side 140, a trusted device 160 may be used. Upon receipt of an access request from the user 100 at the service side 140, the operations controller 145 may check the possibility of using the trusted device 160 to obtain the confidential information needed for the purposes of operation control, for example, the authentication or authorization operations. If it is possible to use the trusted device 160, the operations controller 145 establishes the protected connection 150a with the security server 170. The security server 170 selects the trusted device 160 for the identified user 100 and establishes a protected connection 150b with the trusted device 160. An example, a protected connection is a VPN (Virtual Private Network) connection, which may be based on protocols such as IPSec or PPTP. The protected connection may also be based on the use of WPA technology, the HTTPS protocol, and other means of ensuring secure data transmittal. After the trusted device is selected and the protected connection 150b is established, the user 100 receives a request to enter confidential information for the indicated purposes, for example, for authentication of the user 100 on a particular service 140. Then, the user 100 enters the required confidential information on the trusted device 160, and the confidential information is transmitted by the protected channels 150b and 150a to the operations controller 145 to perform the control of the operation requested by the user 100 on the computer 110 while working with the service 140, using the unsecure computer 110. Thus, in these aspects, hackers are not able to intercept the confidential information entered for purposes of authentication or authorization of an operation on the side of the unsecure computer 110 or unsecure network 130.

Figure 3:
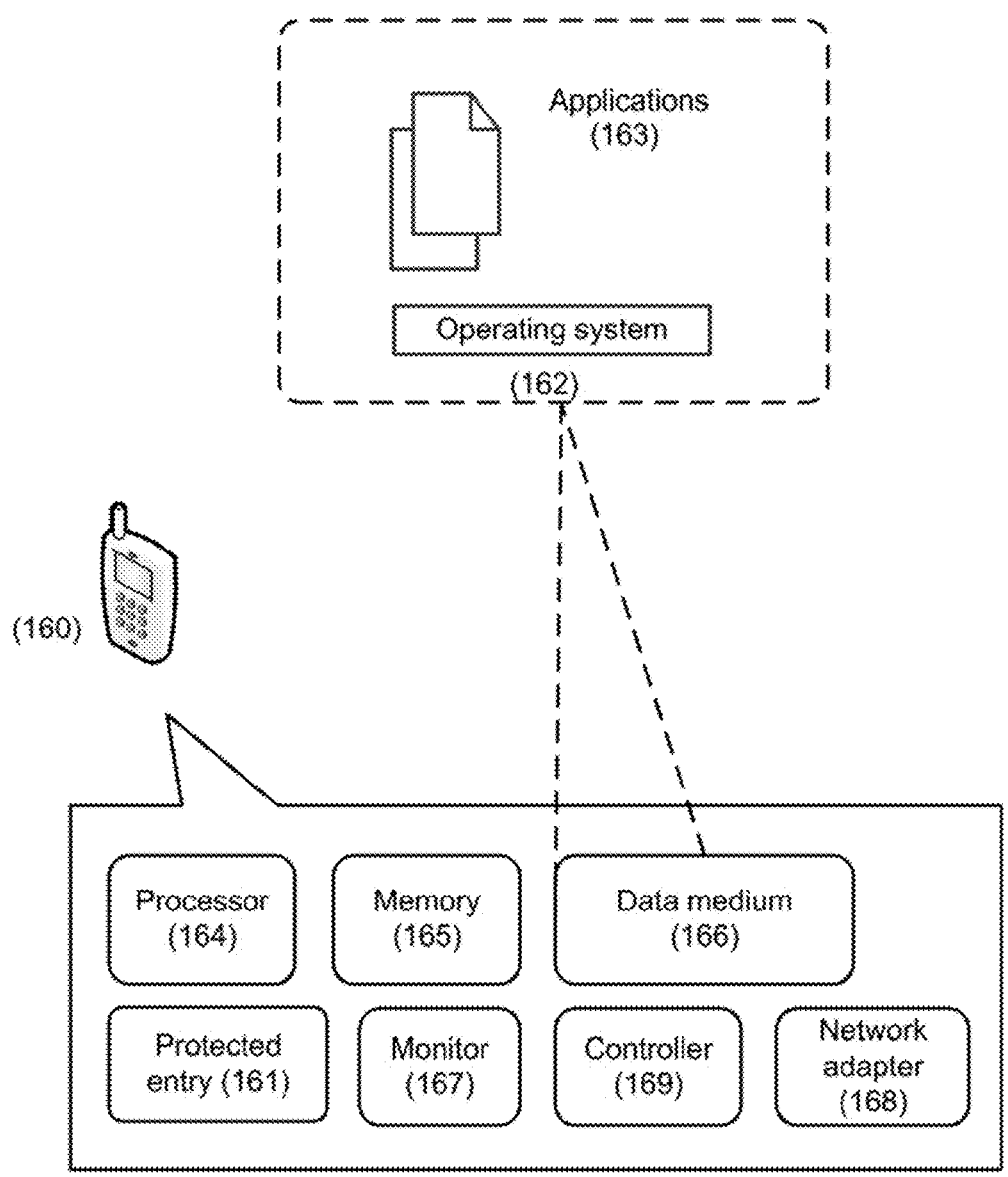
FIG. 3 shows an example of a general purpose computer system, such as a personal computer or a server, suitable for implementing a trusted device.

FIG. 3 illustrates an example trusted device 160. The trusted device 160 includes a processor 164, a main memory 165, a data medium 166 and at least one network adapter 168. The processor 164 may be a processor of any conventional architecture, such as IA-32 (x86), IA-64, ARM, MIPS, PowerPC, SPARC, and VAX. The main memory 165 used may be a DRAM, SRAM, EPROM, Flash or any other conventional memory. The data medium 166 may be a hard disk, a solid state storage, an optical drive, streamer, or any other conventional information medium. The data medium 166 holds the operating system 162 and applications 163 which are loaded in the memory 165. The operating system (OS) 162 may be the Apple Mac OS, Microsoft Windows, NetWare, OS/2, a Unix-like operating system (Linux, HP-UX, FreeBSD, OpenBSD) or any other closed OS. The OS 162, may have an upgraded security model (such as, for example, one described in http://en.wikipedia.org/wiki/Security-focused_operating_system). For example, the upgraded security model may have a mandatory access control (MAC), support technologies such as Address Space Layout Randomization (ASLR) and Data Execution Prevention (DEP), and/or it may use an intrusion detection system (IDS) and other means of heightening the security and reliability of the OS. In the OS 162, the applications 163 are launched, such as a web browser, email client, and others which allow one to work with the service 140. Furthermore, one of the applications 163 may be an antivirus application, a firewall to heighten the security of both the OS 162 and the device 160, or an application used for secure entry of information.

For communication with other computers such as the security server 170, the trusted device 160 uses at least one network adapter 168. The network adapter 168 may be a Wi-Fi adapter (IEEE 802.11 standard), WiMAX, LTE, GSM, Bluetooth or any other adapter for both wireline and wireless communications. In one aspect, if one of the applications 163 is an antivirus application or a firewall, they can also check the trusted device for the presence of malware.

In one example aspect, the trusted device 160 may further include at least one of the following modules: a protected entry module 161, a monitor 167 and a controller 169. The protected entry module 161 may be, for example, a keyboard or touch screen for entry of the necessary data, such as when working with one of the applications 163. The monitor 167 may be used to display information from one of the applications 163 (such as when loading a web page by the browser) or from the OS 162. The controller 169 may be one or more controllers working with such interface types as USB, Thunderbolt, FireWire and others. The controller 169 is used both for connecting the secure data transfer device 160 to the computer 110 and for receiving data from various smart cards (such as eToken) for authentication, for example, on a network resource 140.

In one aspect, the OS 162 and the applications 163 may be implemented by using a system for control of the interaction of program components, based on the use of object attributes and limiting conditions. Examples of such a system are disclosed in the commonly owned U.S. Pat. Nos. 7,386,885 and 7,730,535, which are incorporated by referenced herein in their entirety.

In yet another aspect, the trusted device 160 may additionally include a hacking identification module (not shown), which enables protection of the trusted device 160 against unauthorized opening, theft, or hacking of software. For example, the hacking identification module may erase all information (OS 162, applications 163, data being used) upon detecting outside changes in the main memory 165 or the data medium 166. In addition, the hacking identification module may sever the connection 150b, block access to the protected entry 161, and disconnect the monitor 167 and controller 169. In the event of an occurrence such as unauthorized opening, theft, or hacking of software, the hacking identification module may send information as to the occurrence to the security server 170.

In a particular aspect, the user 100 may register his/her mobile device as a trusted device 160 or receive a trusted device 160 from his/her employer, for example. In these aspects, information about the trusted device 160 of the user 100 is placed in the trusted device database of the security server 170.

In a particular aspect, if a user 100 has more than two trusted devices 160, the choice of the trusted device 160 by the security server 170 may be done by using a database of current threats to information security (not shown), and a database of trusted devices (not shown), including at least the characteristics of the trusted devices, installed modules for information security, and also data on the operating system 162 of the trusted device 160. For example, if malicious software appears for a particular operating system 162 (such as iOS—the Apple operating system for mobile devices), designed to intercept the information that is entered, the security server 170 may select a trusted device 160 with a different operating system 162 or a trusted device 160 on which modules for information security have been installed.

Figure 2:
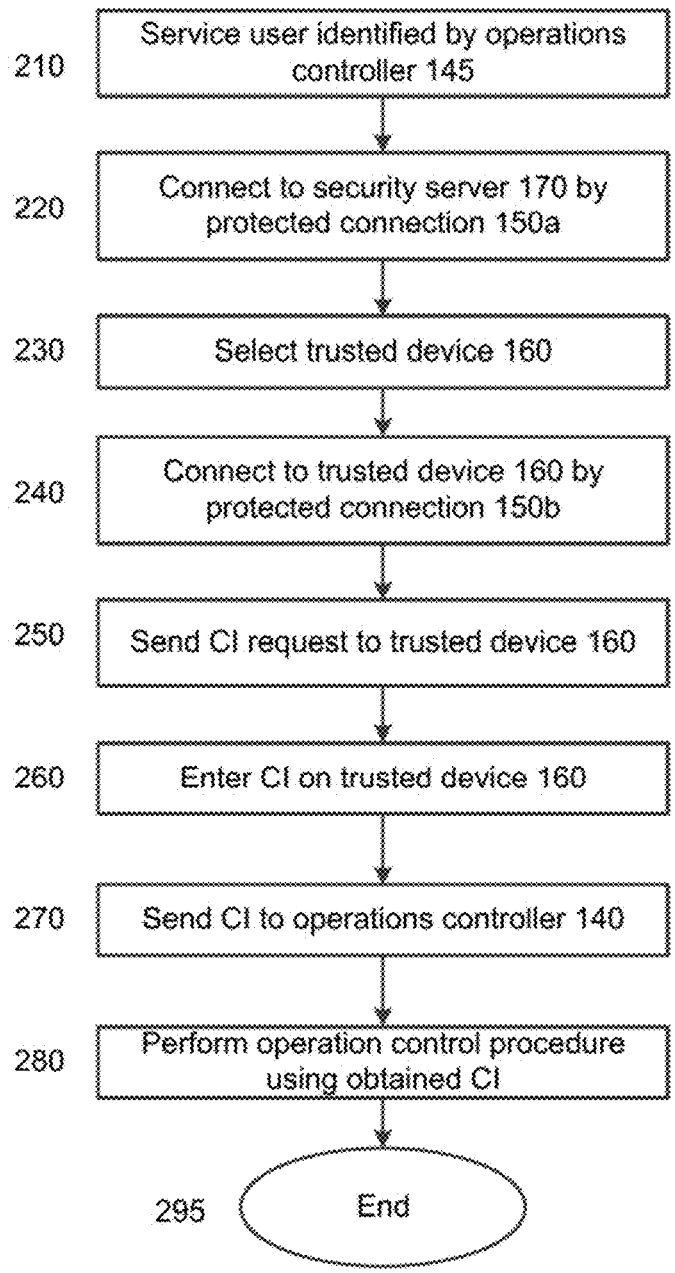
FIG. 2 is a flowchart of an example method of the present disclosure.

FIG. 2 is a flowchart of an example method of the present disclosure. In step 210, the user 100 is identified by the operations controller 145. The identification procedure may be based on data entered by the user on the unsecure computer 110, such as login, user ID, or any other information clearly identifying the user 100. Information identifying the user 100 may also include a credit card number or the ID of the user's personal device (such as an IMEI number). Then, in step 220, a connection is made to the security server 170 with the aid of the protected connection 150a. After this, in step 230, the security server 170 selects the trusted device 160 corresponding to the user 100. In the next step 240, a connection is made to the trusted device 160 with the aid of the protected connection 150b. Then in step 250 the request for confidential information is sent to the trusted device 160. In step 260 the confidential information is entered on the trusted device 160. The entering of the confidential information may be done with the aid of a protected entry module 161, or by using a special application 163 if the trusted module has no protected entry 161. After this, in step 270, the confidential information entered on the trusted device 160 is sent to the operations controller 140. The sending of the confidential information may occur through the security server 170, or directly (not shown) with the aid of a protected connection from the trusted device 160 to the operations controller 145. In step 280 the operation control procedure is carried out, more specifically, the authentication of the user 100 or the authorization of the operation being done by the user 100 are performed, based on the confidential information received from the trusted device 160.

An example aspect of the use of a trusted device 160 to ensure the confidentiality of information used during operations of authentication and authorization is as follows. The user 100 enters the URL address of an online banking site (the service 140), making use of an unsecure computer 110. After the URL address has been entered, a request is sent by this address across an unsecure connection 120a and 120b to the service 140, and if it is necessary to carry out an operation of authentication of the user 100, the service 140 sends a request to the operations controller 145 to carry out the authentication operation. The operations controller 145 can be implemented on the same device as the service 140, or on a separate device. The operations controller 145 checks the possibility of using the trusted device 160 to obtain the confidential information needed for the authentication of the user 100. If it is possible to use the trusted device 160, the operations controller 145 establishes a protected connection 150a with the security server 170. The security server 170 selects the trusted device 160 for the identified user 100 and establishes a protected connection 150b with the trusted device 160. After the trusted device is selected and the protected connection 150b is established, the user 100 receives a request to enter the confidential information for the authentication on the particular service 140 whose URL address was entered by the user 100 previously on the unsecure computer 110. Then, the user 100 enters the needed confidential information on the trusted device 160, which is sent to the operations controller 145 to perform the authentication procedure for the user 100, so that the user may work with the service 140, making use of the unsecure computer 110. Accordingly, in this example, hackers are not able to intercept the confidential information entered for purposes of authentication at the side of the unsecure computer 110 or the unsecure network 130.

Another particular aspect of the use of a trusted device 160 to ensure the confidentiality of information being used during operations of authentication and authorization is as follows. The user creates a command to download and install software from the service 140, using an unsecure computer 110. After the URL address has been entered, a request is sent by this address across an unsecure connection 120a and 120b to the service 140, and if it is necessary to carry out an operation of authorization of this operation, the web browser 140 sends a request to the operations controller 145 to carry out the authorization operation. The operations controller 145 may be implemented on the same device as the service 140, or on a separate device. The operations controller 145 identifies the user 100 responsible for the authorization of this operation, and checks the possibility of using the trusted device 160 to obtain the confidential information needed for the authorization of this operation. If it is possible to use the trusted device 160, the operations controller 145 establishes a protected connection 150a with the security server 170. The security server 170 selects the trusted device 160 for the identified user 100 and establishes a protected connection 150b with the trusted device 160. After the trusted device has been selected and the protected connection 150b established, the user 100 receives a request to enter the confidential information for the authorization of the operation of downloading and installation of software from the service 140 on the unsecure computer 110. Then, the user 100 enters the needed confidential information on the trusted device 160, which is sent to the operations controller 145 to perform the procedure for authorization of the operation of downloading and installation of software from the service 140. Thus, in this aspect, the user 100 has control of the operations occurring on the unprotected computer 110, and also hackers are not able to intercept the confidential information entered for purposes of authorization of the software installation at the side of the unsecure computer 110. This aspect may be implemented in a system of parental control of the programs being installed on children's computers.

Another particular aspect of the use of a trusted device 160 to ensure the confidentiality of information being used during operations of authentication and authorization is as follows. The user 100, which may be a bank customer, intends to use an automated teller machine, for which he/she inserts a card into the reader of the machine, which may be an unsecure computer 110. After the card has been inserted, a request is sent via an unsecure connection 120a and 120b to the server of the card issuer bank 140, and the service 140 sends a request to the operations controller 145 to carry out the operation of authentication of the user 100. The operations controller 145 may be implemented on the same device as the server 140, or on a separate device. The operations controller 145 identifies the user 100 and checks the possibility of using the trusted device 160 to obtain the confidential information needed for the authentication of the user, if it is possible to use the trusted device 160, the operations controller 145 establishes a protected connection 150a with the security server 170. The security server 170 selects the trusted device 160 for the identified user 100 and establishes a protected connection 150b with the trusted device 160. After the trusted device has been selected and the protected connection 150b established, the user 100 receives a request to enter the confidential information for the authentication on the unsecure computer (e.g., am automated teller machine) 110. Then, the user 100 enters the needed confidential information (e.g., a PIN code) on the trusted device 160, which is sent to the operations controller 145 to perform the authentication procedure for the user 100. Thus, in this aspect, the user 100 has control of the operations initiated in his bank account, and also hackers are not able to intercept the PIN code entered for purposes of authentication of the user when using an automated teller machine.

Figure 4:
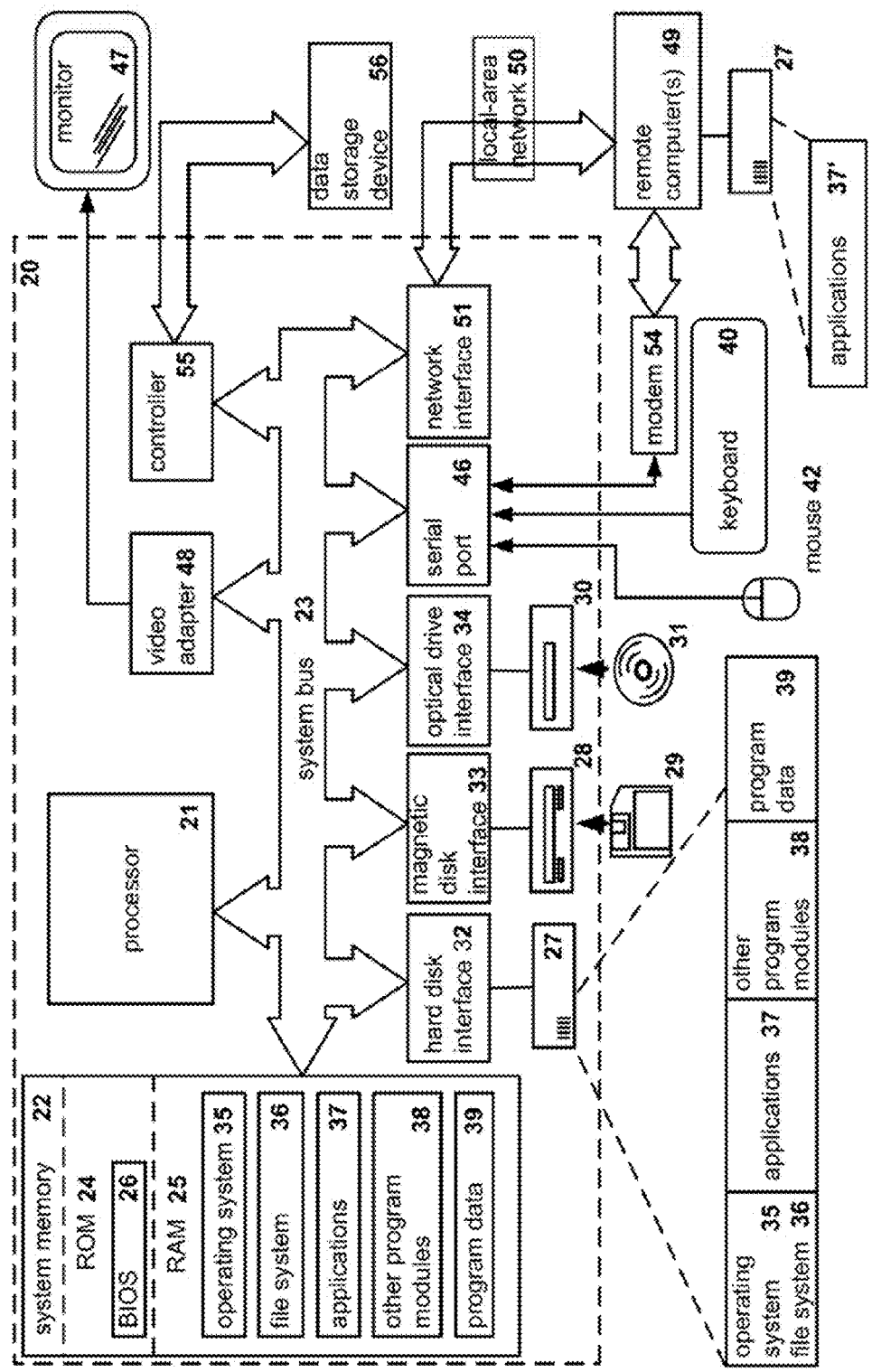
FIG. 4 shows another example of a general purpose computer system, such as a personal computer or a server, suitable for implementing aspects of systems and method disclosed herein.

FIG. 4 shows an example of a general-purpose computer system (which may be a personal computer or a server) 20, including a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing confidentiality of information of a user of a service, comprising:
   receiving a request to perform an operation control procedure for the service;
   identifying the user of the service;
   selecting, based on a database of trusted devices, a trusted device associated with the identified user of the service, comprising: upon detecting two or more trusted devices being associated with the identified user of the service, identifying current malware threats to information security of the detected two or more trusted devices; and selecting the trusted device to avoid the identified current malware threats based at least on information security software installed on each of the two or more trusted devices and data relating to an operating system of each of the two or more trusted devices;
   sending, to the selected trusted device, a request to enter confidential information of the user on the trusted device, wherein the confidential information is used to perform the operation control procedure;
   receiving the confidential information from the selected trusted device; and
   performing the operation control procedure using the received confidential information.

2. The method of claim 1, wherein the identifying the user of the service is based on data entered by the user of the service on a device that is used to send the request to perform the operation control procedure.

3. The method of claim 1, wherein the confidential information is entered by the user of the service on the trusted device through a protected module of the trusted device or through an application.

4. The method of claim 1, wherein the operation control procedure comprises one or more of an operation of authentication of the user of the service or an authorization procedure for the service.

5. The method of claim 1, wherein the service comprises one or more of an online banking service, an Internet commerce service, a payments service, a remote work service, program commands used at critically important infrastructure facilities, or operations of installing software on devices being controlled.

6. The method of claim 1, wherein the confidential information comprises a password to an account record, biometric data, or a PIN code.

7. The method of claim 1, wherein the trusted device comprises a notebook, a netbook, a smartphone, a mobile telephone, a communicator, or a thin client.

8. The method of claim 1, wherein the trusted device uses a protected channel in an encrypted form for receiving the request for the confidential information and sending the confidential information.

9. The method of claim 1, wherein the database of trusted devices includes one or more of:
   characteristics of the trusted devices,
   the installed modules for information security of each of the trusted devices, and
   the data relating to the operating system of each of the trusted devices.

10. The method of claim 1, wherein identifying the current malware threats to information security of the database of trusted devices is based on a database of current threats to information security.

11. A system for providing confidentiality of information of a user of a service, comprising:
a processor configured to:
receive a request to perform an operation control procedure for the service;
identify the user of the service;
select, based on a database of trusted devices, a trusted device associated with the identified user of the service, comprising: upon detecting two or more trusted devices being associated with the identified user of the service, identifying current malware threats to information security of the detected two or more trusted devices; and selecting the trusted device to avoid the identified current malware threats based at least on information security software installed on each of the two or more trusted devices and data relating to an operating system of each of the two or more trusted devices;
send, to the selected trusted device, a request to enter confidential information of the user on the trusted device, wherein the confidential information is used to perform the operation control procedure;
receive the confidential information from the selected trusted device; and
perform the operation control procedure using the received confidential information.

12. The system of claim 11, wherein the identifying the user of the service is based on data entered by the user of the service on a device that is used to send the request to perform the operation control procedure.

13. The system of claim 11, wherein the confidential information is entered by the user of the service on the trusted device through a protected module of the trusted device or through an application.

14. The system of claim 11, wherein the operation control procedure comprises one or more of an operation of authentication of the user of the service or an authorization procedure for the service.

15. The system of claim 11, wherein the service comprises one or more of an online banking service, an Internet commerce service, a payments service, a remote work service, program commands used at critically important infrastructure facilities, or operations of installing software on devices being controlled.

16. The system of claim 11, wherein the confidential information comprises a password to an account record, biometric data, or a PIN code.

17. The system of claim 11, wherein the trusted device comprises a notebook, a netbook, a smartphone, a mobile telephone, a communicator, or a thin client.

18. The system of claim 11, wherein the trusted device uses a protected channel in an encrypted form for receiving the request for the confidential information and sending the confidential information.

19. A computer program product stored on a non-transitory computer-readable storage medium, the computer program product comprising computer-executable instructions for providing confidentiality of information of a user of a service, including instructions for:
receiving a request to perform an operation control procedure for the service;
identifying the user of the service;
selecting, based on a database of trusted devices, a trusted device associated with the identified user of the service, comprising: upon detecting two or more trusted devices being associated with the identified user of the service, identifying current malware threats to information security of the detected two or more trusted devices; and selecting the trusted device to avoid the identified current malware threats based at least on information security software installed on each of the two or more trusted devices and data relating to an operating system of each of the two or more trusted devices;
sending, to the selected trusted device, a request to enter confidential information of the user on the trusted device, wherein the confidential information is used to perform the operation control procedure;
receiving the confidential information from the selected trusted device; and
performing the operation control procedure using the received confidential information.

20. The computer program product of claim 19, wherein the identifying the user of the service is based on data entered by the user of the service on a device that is used to send the request to perform the operation control procedure.

21. The computer program product of claim 19, wherein the confidential information is entered by the user of the service on the trusted device through a protected module of the trusted device or through an application.

22. The computer program product of claim 19, wherein the operation control procedure comprises one or more of an operation of authentication of the user of the service or an authorization procedure for the service.

23. The computer program product of claim 19, wherein the confidential information comprises a password to an account record, biometric data, or a PIN code.

24. The computer program product of claim 19, wherein the trusted device uses a protected channel in an encrypted form for receiving the request for the confidential information and sending the confidential information.

* * * * *